(12) United States Patent
Leyrer et al.

(10) Patent No.: US 7,264,748 B2
(45) Date of Patent: Sep. 4, 2007

(54) AQUEOUS MINI-EMULSIONS WHICH ARE STABLE IN STORAGE AND BASED ON CHOLESTERIC MIXTURES

(75) Inventors: Reinhold J. Leyrer, Dannstadt (DE); Dhruva Ramkumar, Mumbai (IN); Holger Schoepke, Neckargemuend (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 437 days.

(21) Appl. No.: 10/501,915

(22) PCT Filed: Jan. 30, 2003

(86) PCT No.: PCT/EP03/00944

§ 371 (c)(1),
(2), (4) Date: Jul. 27, 2004

(87) PCT Pub. No.: WO03/064559

PCT Pub. Date: Aug. 7, 2003

(65) Prior Publication Data

US 2005/0145829 A1 Jul. 7, 2005

(30) Foreign Application Priority Data

Feb. 1, 2002 (DE) .................. 102 03 938

(51) Int. Cl.
*C09K 19/38* (2006.01)
*C09K 19/02* (2006.01)
*C09K 19/20* (2006.01)

(52) U.S. Cl. ............ 252/299.01; 252/299.67; 516/900

(58) Field of Classification Search ........... 252/299.01, 252/299.67; 428/1.1, 1.3; 516/900
See application file for complete search history.

(56) References Cited

U.S. PATENT DOCUMENTS

| 4,952,334 A | 8/1990 | Hakemi et al. |
| 5,730,899 A * | 3/1998 | Ohnishi et al. ......... 252/299.01 |
| 5,798,147 A * | 8/1998 | Beck et al. ................. 427/511 |
| 6,204,900 B1 * | 3/2001 | Fergason ..................... 349/86 |
| 6,616,990 B2 * | 9/2003 | Prechtl et al. ............... 428/1.1 |

FOREIGN PATENT DOCUMENTS

| DE | 197 16 822 | 10/1998 |
| DE | 197 38 369 | 3/1999 |
| GB | 2 328 436 | 2/1999 |
| WO | 96/02597 | 2/1996 |

OTHER PUBLICATIONS

H. Baessler, et al., "Helical twisting power of steroidal solutes in cholesteric mesophases", The Journal of Chemical Physics, vol. 52, No. 2, pp. 631-637 Jan. 15, 1970.

* cited by examiner

*Primary Examiner*—Shean C Wu
(74) *Attorney, Agent, or Firm*—Oblon, Spivak, McClelland, Maier & Neustadt, P.C.

(57) ABSTRACT

A storage-stable aqueous miniemulsion whose disperse phase comprises a cholesteric mixture is prepared and is used for coating and printing on suitable substrates.

14 Claims, No Drawings

AQUEOUS MINI-EMULSIONS WHICH ARE STABLE IN STORAGE AND BASED ON CHOLESTERIC MIXTURES

The present invention relates to storage-stable aqueous miniemulsions whose disperse phase comprises a cholesteric mixture, a process for their preparation and their use.

When shape-anisotropic substances are heated, liquid-crystalline phases, i.e. mesophases, can occur. The individual phases differ in the spatial arrangement of the molecular concentrations on the one hand and in the molecular arrangement with respect to the longitudinal axes on the other hand (G. W. Gray, P. A Winsor, Liquid Crystals and Plastic Crystals, Ellis Horwood Limited, Chichester, 1974).

The nematic liquid crystalline phase has a parallel orientation of the longitudinal molecular axes (unidimensionally ordered state). Provided that the molecules constituting the nematic phase are chiral, a chiral nematic (cholesteric) phase forms, in which the longitudinal axes of the molecules form a helical superstructure perpendicular to them (H. Baessler, Festkörperprobleme XI, 1971). The chiral molecular moiety may both be present in the liquid crystalline molecule itself and be added as a dopant to the nematic phase, with the result that the chiral nematic phase is induced. This phenomenon was first investigated on cholesterol derivatives (e.g. H. Baessler, M. M. Labes, J. Chem. Phys. 52, 631 (1970)).

The chiral nematic phase has particular optical properties: a large optical rotation and pronounced circular dichroism which arises through selective reflection of circularly polarized light within the chiral nematic layer. If the pitch of the helical superstructure corresponds to the wavelength of visible light, a Grandjean texture is formed. The colors appear different depending on the angle of view and depend on the pitch of the helical structure, which in turn depends on the twisting ability of the chiral component. The pitch and hence the wavelength range of the selectively reflected light of a chiral nematic layer can be varied in particular by changing the concentration of a chiral dopant. Such chiral nematic systems offer interesting possibilities for practical use.

Cholesteric effect pigments are known. For example, DE-A-197 38 369 describes interference pigments comprising molecules fixed in cholesteric arrangement. For the preparation of these pigments, liquid crystalline material is applied to a carrier, oriented and, if required, crosslinked. The cholesteric layer is then removed from the carrier and comminuted. The pigments thus obtained are used as a rule in the form of finishes or printing inks for coating or printing. On the one hand, the necessity of using organic solvents for diluting the liquid crystalline material prior to application to the carrier and the pigments if they are used in finishes or printing inks and, on the other hand, the multistage procedure for preparing the pigments are disadvantageous.

EP-A-0 793 693 describes aqueous dispersions of cholesteric mixtures which absolutely require the presence of dispersants. However, the Applicant's experiments have shown that the presence of dispersants adversely influences the color effects of the coatings. Furthermore, EP-A-0 796 693 mentions aqueous miniemulsions of cholesteric mixtures having a storage stability of several weeks, but without giving a preparation example therefor. However, present-day requirements with regard to emulsions require a storage stability of several months.

It is an object of the present invention to overcome the described advantages of the prior art.

We have found that this object is achieved by a storage-stable aqueous miniemulsion whose disperse phase comprises the following components:

a) at least one achiral nematic polymerizable monomer selected from polyfunctionally polymerizable monomers, monofunctionally polymerizable monomers or mixtures thereof;

b) at least one achiral nematic nonpolymerizable compound and c) at least one chiral di- or monofunctionally polymerizable monomer.

In the context of the present invention, the term miniemulsion refers to an emulsion whose disperse phase has a volume average droplet size of from 100 nm to 1 µm (cf. Römpp, Lexikon der Chemie, 10th edition, Georg Thieme Verlag, Stuttgart, N.Y., Vol. 4, page 2502). The disperse phase preferably has a volume average droplet size of from 100 to 600 nm, particularly preferably from 200 to 500 nm, in particular from 300 to 400 nm.

The achiral nematic polyfunctionally polymerizable monomer is preferably difunctionally polymerizable and preferably corresponds to the formula I

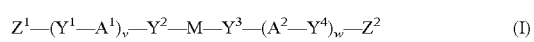
$$Z^1-(Y^1-A^1)_v-Y^2-M-Y^3-(A^2-Y^4)_w-Z^2 \qquad (I)$$

where $Z^1$ and $Z^2$ are identical or different reactive groups via which a polymerization can take place, or radicals which contain such reactive groups, the reactive groups being C=C double bonds, C≡C triple bonds, or oxirane, thiirane, azirane, cyanate, thiocyanate, isocyanate, carboxyl, hydroxyl or amino groups, C=C double bonds being particularly preferred;

$Y^1$, $Y^2$, $Y^3$ and $Y^4$, independently of one another, are a chemical bond, O, S, —CO—O—, —O—CO—, —O—CO—O—, —CO—S—, —S—CO—, —CO—N(R)—, —N(R)—CO—, —N(R)—CO—O—, —O—CO—N(R)—, —N(R)—CO—N(R)—, —CH$_2$—O— or —O—CH$_2$—, preferably —CO—O—, —O—CO— or —O—CO—O—, R being hydrogen or $C_1$-$C_4$-alkyl;

$A^1$ and $A^2$ are identical or different spacers, for example linear $C_2$-$C_{30}$-alkylene groups, preferably $C_2$-$C_{12}$-alkylene groups, which may be interrupted by oxygen, sulfur or unsubstituted or monosubstituted nitrogen, it not being permitted for these interrupting groups to be neighboring; suitable amine subtituents comprising $C_1$-$C_4$-alkyl groups, it being possible for the alkylene chains to be substituted by fluorine, chlorine, bromine, cyano, methyl or ethyl; and $A^1$ and $A^2$ particularly preferably being —(CH$_2$)—$_n$ where n=2 to 6;

v and w are 0 or 1;

M is a mesogenic group which is preferably of the formula II:

$$(T-Y^5)_m-T \qquad (II)$$

where

T are identical or different divalent isocycloaliphatic, heterocycloaliphatic, isoaromatic or heteroaromatic radicals, preferably 1,4-bonded unsubstituted or mono- to polysubstituted, e.g. mono- to tetrasubstituted, benzene rings,

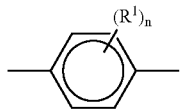

where
$R^1$ is fluorine, chlorine, bromine, $C_1$-$C_{20}$-alkyl, $C_1$-$C_{20}$-alkoxy, $C_1$-$C_{20}$-alkylcarbonyl, $C_1$-$C_{20}$-alkylcarbonyloxy, hydroxyl, nitro, CHO or CN, preferably chlorine, bromine or $C_1$-$C_4$-alkyl, in particular methyl; and
n is an integer from 0 to 4, preferably from 0 to 2, in particular 0 or 1;
$Y^5$ are identical or different bridge members —CO—O—, —O—CO—, —CH$_2$—O—, —O—CH$_2$—, —CO—S—, —S—CO—, —CH$_2$—S—, —S—CH$_2$—, —CH=N— or —N=CH— or a direct bond, preferably —CO—O— or —O—CO—, and
m is an integer from 0 to 3, preferably 0, 1 or 2.

The mesogenic group preferably contains a substituted 1,4-dioxybenzene building block, in particular a methyl-substituted 1,4-dioxybenzene building block, or an unsubstituted benzene building block.

Particularly preferred mesogenic groups have the following structures VI or VII:

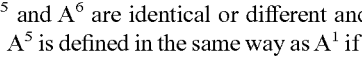

(VI)

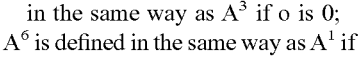

(VII)

where
$R^1$ is fluorine, chlorine, bromine, $C_1$-$C_{20}$-alkyl, $C_1$-$C_{20}$-alkoxy, $C_1$-$C_{20}$-alkylcarbonyl, $C_1$-$C_{20}$-alkylcarbonyloxy, hydroxyl, nitro, CHO or CN and
n is an integer from 0 to 4.

In the mesogenic group VI, $R^1$ is particularly preferably chlorine, bromine or $C_1$-$C_4$-alkyl, in particular methyl, and n is from 0 to 2, in particular 0 or 1.

The achiral nematic monofunctionally polymerizable monomer is preferably of the formula IIIa or IIIb $$A^3—Y^2—M—Y^3(A^1—Y^4)_w Z^1 \quad (IIIa)$$

or $$Z^1—(Y^1—A^1)_v—Y^2—M—Y^3—A^3 \quad (IIIb)$$

where $Z^1$, $A^1$, $Y^1$, $Y^2$, $Y^3$, $Y^4$, M, v and w have the abovementioned meanings and $A^3$ is a linear $C_2$-$C_{30}$-alkyl group, preferably $C_2$-$C_{12}$-alkyl group, which may be interrupted by oxygen, sulfur or unsubstituted or monosubstituted nitrogen, it not being permitted for these interrupting groups to be neighboring; suitable amine substituents comprising $C_1$-$C_4$-alkyl groups, it being possible for the alkyl groups to be substituted by fluorine, chlorine, bromine, cyano, methyl or ethyl; and $A^3$ particularly preferably being $(CH_3CH_2)_l$ groups where $l=1$ to 7.

The achiral nematic nonpolymerizable compound is preferably of the formula IV $$A^3—Y^1—M—Y^2—A^4 \quad (IV)$$

where
$A^3$, $Y^1$, $Y^2$ and M have the abovementioned meanings and $A^4$ is defined in the same way as $A^3$.

The chiral di- or monofunctionally polymerizable monomer is preferably of the formula V $$[(Z^1—Y^1)_o—A^5—Y^2—M—Y^3]_n X[Y^3—M—Y^2-A^6—(Y^1—Z^1)_p]_m \quad (V)$$

where
$Z^1$, $Y^1$, $Y^2$, $Y^3$ and M are as defined above,
o and p are 0 or 1, it not being permitted for o and p to simultaneously be 0,
$A^5$ and $A^6$ are identical or different and
$A^5$ is defined in the same way as $A^1$ if o is 1 or is defined in the same way as $A^3$ if o is 0;
$A^6$ is defined in the same way as $A^1$ if p is 1 or is defined in the same way as $A^3$ if p is 0;
n and m are 0, 1 or 2, the sum n+m being equal to 1 or 2; and
X is a chiral radical.

Inter alia owing to the easier availability, particularly preferred chiral radicals X of the compounds of the formula V are those which are derived from sugars, dinaphthyl or diphenyl derivatives and optically active glycols, alcohols or amino acids. In the case of the sugars, particular examples are pentoses and hexoses and derivatives derived therefrom.

Examples of radicals X are the following structures, the terminal lines denoting the free valencies in each case.

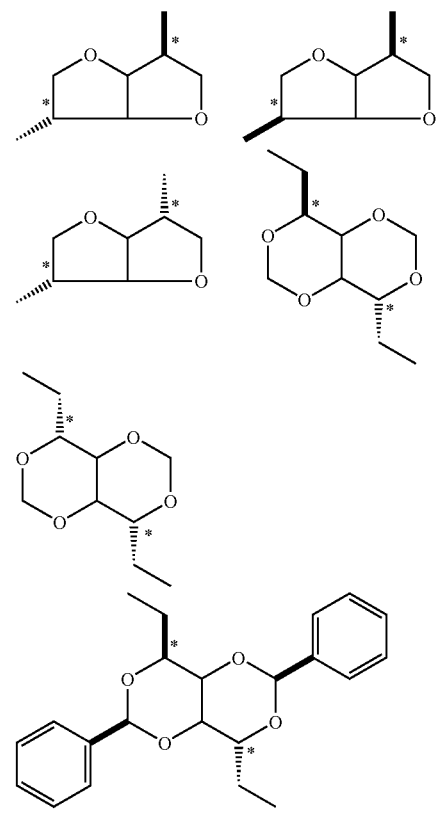

-continued
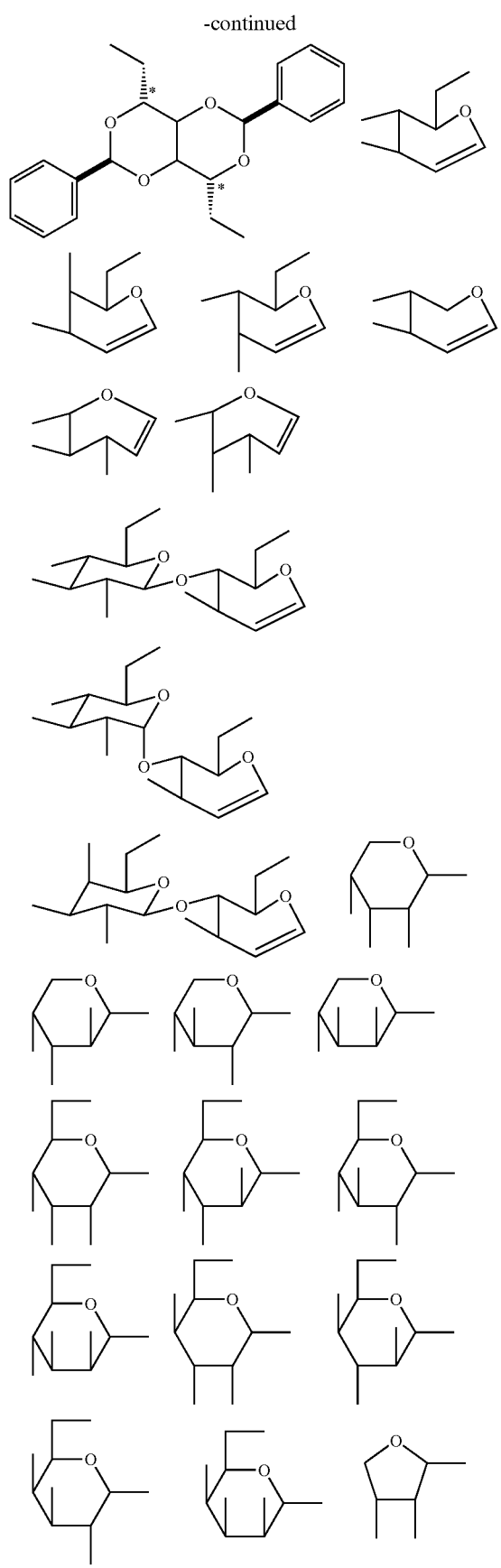
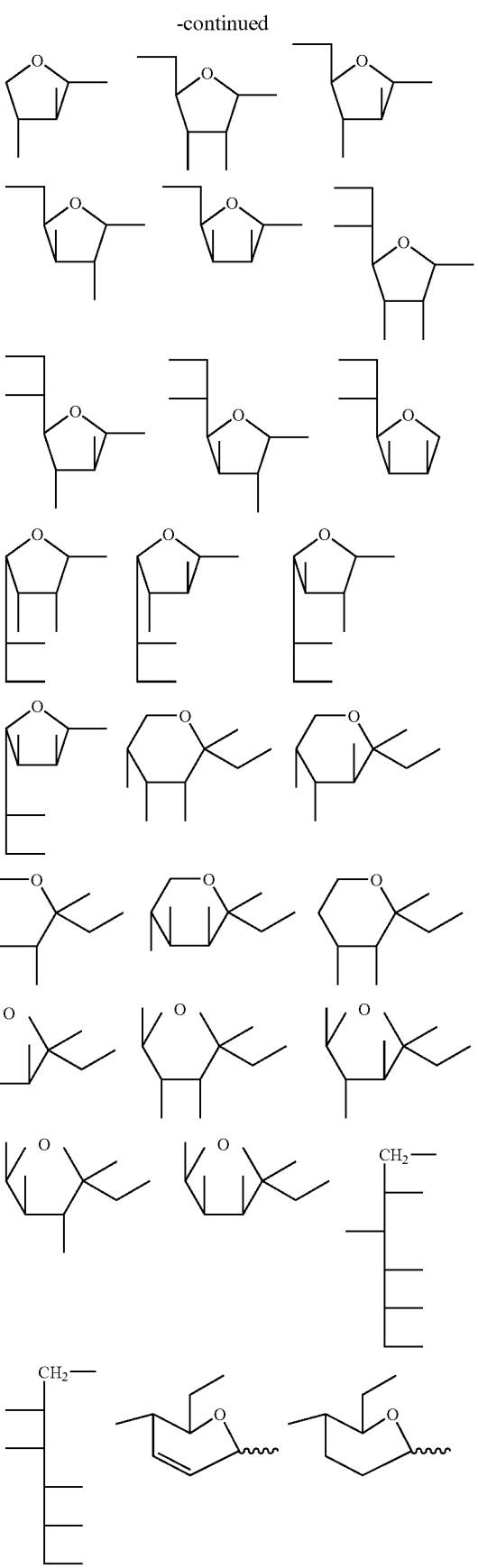

-continued

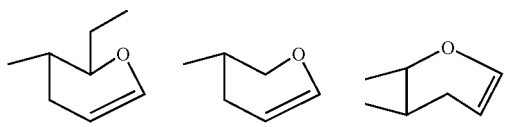

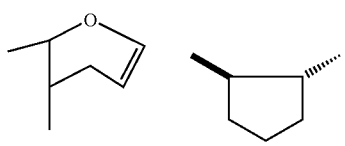

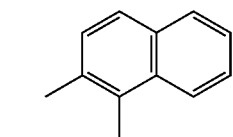

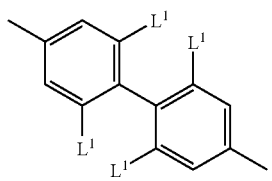

where
L¹ is $C_1$-$C_4$-alkyl, $C_1$-$C_4$-alkoxy, halogen, $COOR^2$, $OCOR^2$ or $NHCOR^2$ and $R^2$ is $C_1$-$C_4$-alkyl or hydrogen.

Particularly preferred are

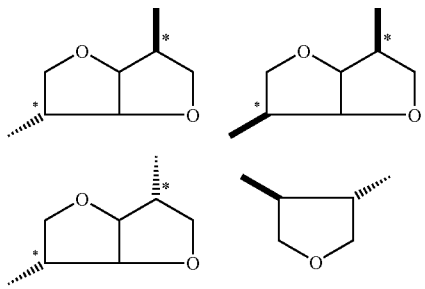

Also suitable are chiral groups which have the following structures:

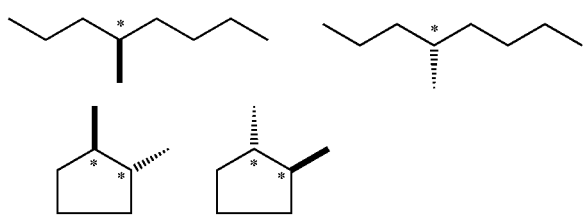

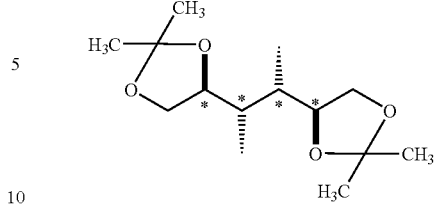

In the above definition of the groups $A^1$, $A^2$, $A^3$, $A^4$, $A^5$, $A^6$, $R^1$, $R^2$ and $L^1$, $C_1$-$C_{20}$-alkyl is in particular methyl, ethyl, n-propyl, isopropyl, n-butyl, sec-butyl, isobutyl, tert-butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl;

$C_1$-$C_4$-Alkyl is in particular methyl, ethyl, n-propyl, isopropyl, n-butyl, sec-butyl, isobutyl or tert-butyl;

$C_1$-$C_{20}$-Alkoxy is in particular alkoxy whose alkyl radical corresponds to the abovementioned $C_1$-$C_{20}$-alkyl groups; and $C_2$-$C_{30}$-alkylene is in particular alkylene which is derived from the abovementioned $C_2$-$C_{20}$-alkyl groups, or is a linear $C_{21}$-$C_{30}$-analog.

If, in formula I of the achiral nematic difunctionally olymerizable monomer, n is 0, the miniemulsion preferably also contains at least one achiral, nematic difunctionally polymerizable monomer in which n is not equal to 0.

In a preferred embodiment, the disperse phase of the miniemuls-ion comprises the following components:

a1) at least one achiral nematic difunctionally polymerizable monomer;

a2) at least two achiral nematic monofunctionally polymerizable monomers;

b) at least one achiral nematic nonpolymerizable compound and c) at least one chiral di- or monofunctionally polymerizable monomer, the nematic and chiral compounds being defined as described above. Preferably, the nematic components have the same mesogenic group.

The disperse phase particularly preferably comprises the following components:

a1) an achiral nematic difunctionally polymerizable monomer;

a2) two achiral nematic monofunctionally polymerizable monomers;

b) an achiral nematic nonpolymerizable compound and c) a chiral di- or monofunctionally polymerizable monomer, the nematic components having the same mesogenic group.

The nematic and chiral compounds are defined as described above. The mesogenic phase of the nematic components a1), a2) and b) preferably contains a mono- to tetrasubstituted benzene building block, particularly preferably a mono- to tetrasubstituted 1,4-dioxybenzene building block, the substituents being selected from fluorine, chlorine, bromine, $C_1$-$C_{20}$-alkyl, $C_1$-$C_{20}$-alkoxy, $C_1$-$C_{20}$-alkylcarbonyl, $C_1$-$C_{20}$-alkylcarbonyloxy, CHO and CN, preferably from $C_1$-$C_4$-alkyl, chlorine and bromine, particularly preferably from chlorine and methyl, in particular from methyl. The benzene building block is particularly preferably monosubstituted. In particular, it is a methyl-substituted 1,4-dioxybenzene building block. A particularly preferred mesogenic group has the following structure:

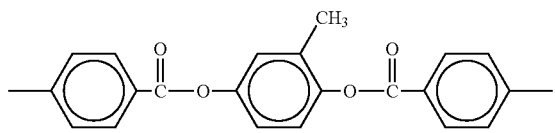

The disperse phase particularly preferably comprises the following components:
a1) an achiral nematic difunctionally polymerizable monomer;
a2) two achiral nematic monofunctionally polymerizable monomers;
a3) an achiral nematic difunctionally polymerizable monomer;
b) an achiral nematic nonpolymerizable compound and
c) a chiral di- or monofunctionally polymerizable monomer, the nematic components a1), a2) and b) having the same mesogenic group and a3) having a mesogenic group differing from this.

The nematic and chiral compounds are defined as described above. For the mesogenic phase of the nematic components a1), a2) and b), the above statements apply. The mesogenic phase of the nematic component a3) preferably contains unsubstituted benzene building blocks.

The disperse phase of the miniemulsion preferably contains from 60 to 99, particularly preferably from 65 to 99.7, mol % of the components a1), a2) and b), from 0 to 39, particularly preferably from 0 to 34, mol % of component a3) and from 0.3 to 10, particularly preferably from 0.3 to 5, in particular from 0.5 to 3, mol % of component c).

The molar ratio of the components a1):a2):b) is preferably 1:1.5-3.0:0.5-1.5, particularly preferably 1:1.8-2.3:0.8-1.4.

The molar ratio of the components a1):a2):b):a3) is preferably 1:1.5-3.0:0.5-1.5:1.5-3.5, particularly preferably 1:1.8-2.3:0.8-1.4:1.8-3.0.

In a particular embodiment, the disperse phase contains the following components:

a1)
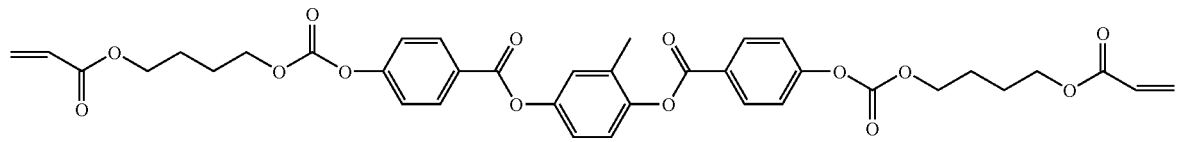

a2)
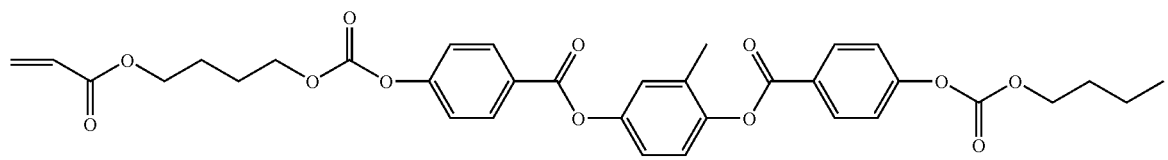

and

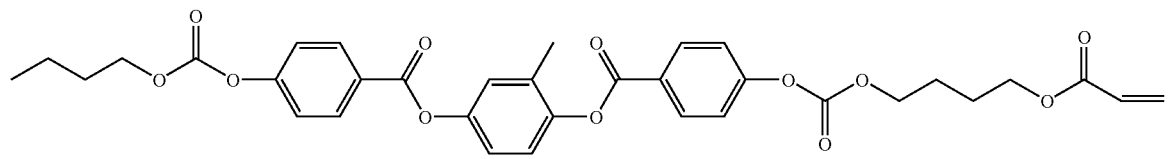

a3)
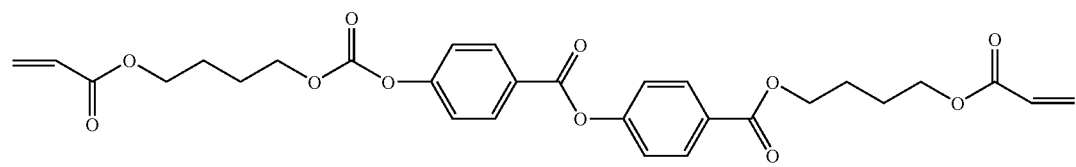

b)
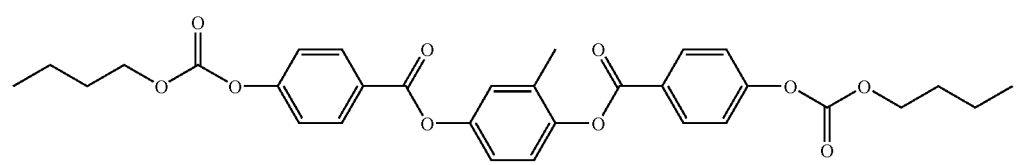

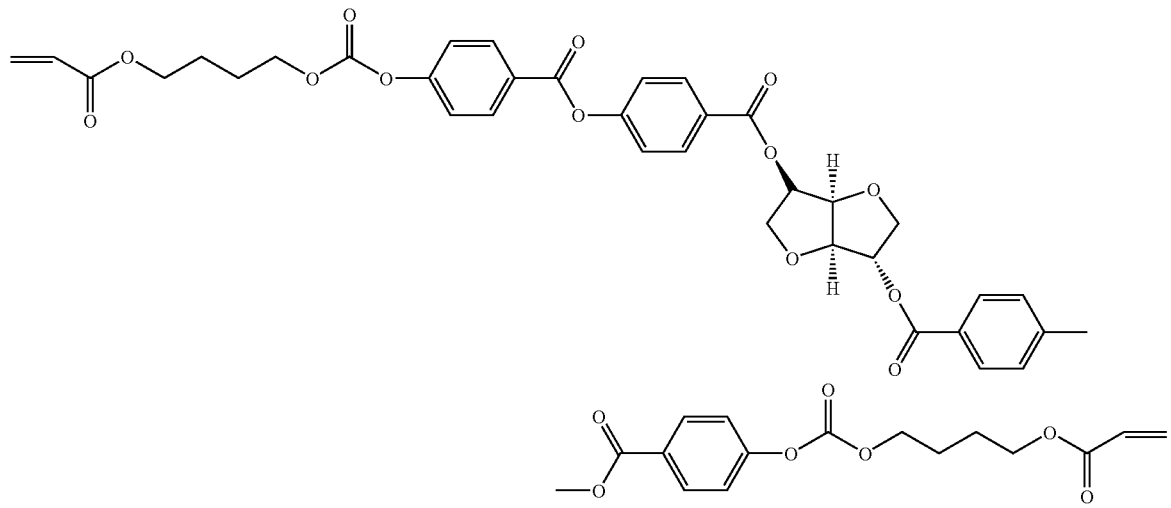

c)

In addition, the disperse phase of the miniemulsion may contain up to 5% by weight, based on the total weight of the disperse phase, of assistants. The assistants include, inter alia, UV stabilizers, emulsifiers, rheology modifiers and substrate wetting additives.

Emulsifiers used may be both nonionic and preferably ionic. The preferred ionic emulsifiers include salts of $C_{10}$-$C_{22}$-alkylsulfonic acids or $C_{10}$-$C_{22}$-alkylcarboxylic acids, particularly preferably the alkali metal salts, in particular the sodium salts, and the sulfosuccinates, e.g. di(2-ethylhexyl) sulfosuccinate.

If required, the polymerizable or crosslinkable mixture also contains UV stabilizers and stabilizers against weather influences. For example, derivatives of 2,4-dihydroxybenzophenone, derivatives of 2-cyano-3,3-diphenylacrylate, derivatives of 2,2',4,4'-tetrahydrobenzophenone, derivatives of orthohydroxyphenylbenzotriazole, salicylic esters, ortho-hydroxyphenyl-s-triazines or sterically hindered amines are suitable for this purpose. These substances may be used alone or preferably in the form of mixtures.

Rheology modifiers increase the viscosity and improve the leveling and application properties. Particularly suitable rheology modifiers are the associative polyurethane thickeners. These are hydrophobic modified polyalkylene oxide-urethanes, in particular polyethylene oxide- or polyethylene oxide-polypropylene oxide-urethanes, and block copolymers thereof. The preferred, commercially available urethane thickeners include Rheolate® from Kronos Titan GmbH, Rheox, Inc., Bermodol® from Langen & Co., Collacral® LR 8990, Collacral® Pu 75 and Collacral® PU 85 from BASF AG and the Acrysole® from Rohm & Haas. Acrysol RM-8 is particularly preferably used. If it is intended in particular to increase the viscosity, the swelling thickeners Alcoprint® from Allied Colloids/Ciba and Lutexal HEF or HIT from BASF AG are suitable.

Substrate wetting additives improve the wetting and spreading behavior of the emulsion on the substrate. The suitable substrate wetting additives include nonionic surfactants, polyether-modified polysiloxanes and mixtures thereof. The particularly suitable, commercially available substrate wetting additives include Tego® Wet 260 from Tego Chemie and the Byk® silicone additives of the Byk 3xx series from Byk Chemie and mixtures of different Byk 3xx additives.

The emulsifiers are preferably used in an amount of up to 3, preferably up to 2, % by weight, based on the total weight of the disperse phase. The rheology modifiers are preferably used in an amount of up to 1.5, preferably up to 1, % by weight, based on the total weight of the disperse phase. The substrate wetting additives are used in an amount of up to 0.5, preferably up to 0.1, % by weight, based on the total weight of the disperse phase.

In order additionally to modify the perceived color, pigments or dyes can, if required, be added to the novel composition in a small amount, for example up to 20% by weight. The following may be mentioned as nonlimiting examples: inorganic compounds, such as very finely divided transparent lamellar pigments, such as those sold under the name Mica by Merck, iron oxides, titanium oxide and carbon black, or organic compounds, such as those from the classes consisting of the monoazo pigments, monoazo dyes and metal salts thereof, disazo pigments, condensed disazo pigments, isoindole derivatives, derivatives of naphthalene- or perylenetetracarboxylic acid, anthraquinone pigments, thioindigo derivatives, azomethine derivatives, quinacridones, dioxazines, pyrazoloquinazolones, phthalocyanine pigments or basic dyes, such as triarylmethane dyes and salts thereof.

If it is to be photochemically cured, the miniemulsion may also contain photoinitiators in an amount of from 2 to 5% by weight or, in the case of curing under inert gas, from 0.3 to 2% by weight, based on the total weight of the disperse phase. Suitable photoinitiators are, for example, isobutyl-benzoin ether, 2,4,6-trimethylbenzoyldiphenylphosphine oxide, 1-hydroxycyclohexyl phenyl ketone, 2-benzyl-2-dimethylamino-1-(4-morpholinophenyl)furan-1-one, mixtures of benzophenone and 1-hydroxycyclohexyl phenyl ketone, 2,2-dimethoxy-2-phenylacetophenone, perfluorinated diphenyltitanocenes, 2-methyl-1-(4-[methylthio]-phenyl)-2-(4-morpholinyl)-1-propanone, 2-hydroxy-2-methyl-1-phenyl-propan-1-one, 4-(2-hydroxyethoxy)phenyl-2-hydroxy-2-propyl ketone, 2,2-diethoxyacetophenone, 4-benzoyl-4'-methyldiphenyl sulfide, ethyl-4-(dimethylamino)benzoate, mixtures of 2-isopropylthioxanthone and 4-isopropylthioxanthone, 2-(dimethylamino)ethyl benzoate, d,l-campherquinone, ethyl-d,l-campherquinone, mixtures of benzophenone and 4-methylbenzophenone, benzophenone, 4,4'-bisdimethylaminobenzophenone, ($\eta^5$-cyclopentadienyl) ($\eta^6$-isopropylphenyl)iron(II) hexafluorophosphate, triphenylsulfonium hexafluorophosphate or mixtures of triphenylsulfonium salts, and butanediol diacrylate, dipropylene glycol diacrylate, hexanediol diacrylate, 4-(1,1-dimethylethyl)cyclohexyl acrylate, trimethylolpropane triacrylate and tripropylene glycol diacrylate.

Photoinitiators which do not lead to yellowing are preferably used, for example benzophenone compounds or morpholine compounds.

The novel miniemulsion contains from 20 to 95, preferably from 50 to 60, % by weight, based on the total weight of the emulsion, of disperse phase.

Owing to the novel design of the composition of the disperse phase, the drop formation thereof and hence the conversion into an aqueous miniemulsion are particularly facilitated. Because of the small proportion of binders, dispersants and thickeners as well as emulsifiers, a coating having surprisingly advantageous color flop, gloss and color intensity can be produced in comparison with aqueous dispersions of the prior art. A further advantage of the novel miniemulsion is that no organic solvents or diluents are used and it is therefore more environmentally friendly. Moreover, with a shelf life of at least 6 months, it is substantially more storage-stable than all aqueous emulsions of cholesteric mixtures known to date.

The present invention furthermore relates to a process for the preparation of a storage-stable aqueous miniemulsion which is characterized as described above.

For this purpose, all constituents of the disperse phase are emulsified in a conventional manner in water and the conventional emulsion obtainable thereby is then treated with a high-pressure homogenizer. The components of the emulsion can either all be initially taken or the slightly heated cholesteric mixture can be added to the aqueous phase, which may contain assistants.

The conventional preparation of an emulsion is effected by introducing energy into the mixture, inter alia by shaking, beating, stirring, turbulent mixing, injection of one liquid into the other, vibrations and cavitation in the mixture, for example ultrasound. Dynamic or static systems, for example stirred kettles, stirred ball mills, roll mills, rotor-stator systems, emulsifying centrifuges, colloid mills, toothed-wheel dispersers, ultrasonic homogenizers, jet dispersers, shear gap mixers and other systems which are sufficiently well known to a person skilled in the art are used for this purpose. An Ultra-Turrax is particularly preferably used.

The emulsion obtainable thereby is a macroemulsion, i.e. an emulsion whose disperse phase has a volume average particle diameter in the µm range.

This macroemulsion is then treated with a high-pressure homogenizer. Suitable high-pressure homogenizers contain abrasion-resistant shearing units. These include, for example, the high-pressure homogenizers from APV invensys, Bran & Lübbe (Meganizer type) and Niro Soavi. The principle is based on the fact that the preemulsion is brought to about 400 to 1 000 bar by a high-pressure pump, accelerated through an annular gap and relaxed. However, the microfluidizer from Microfluidics, having abrasion-resistant Y- and Z-chambers, is particularly preferably used. There, the mixture is homogenized at from 50 to 2 000, preferably from 500 to 1 500, in particular about 1 000, bar.

The emulsion obtainable thereby is a miniemulsion, i.e. an emulsion whose disperse phase has a volume average particle diameter of from about 100 nm to 1 µm. The disperse phase preferably has a volume average particle diameter of from 100 to 600 nm, particularly preferably from 200 to 500 nm, in particular from 300 to 400 nm.

The present invention furthermore relates to the use of the miniemulsion described above for coating and printing on flexible and rigid substrates and a process for coating and printing on flexible and rigid substrates with the novel miniemulsion. In particular, the suitability for coating rigid and flexible substrates is a further significant advantage of the novel formulations, which, in contrast to known mixtures, show little or no embrittlement.

Suitable substrates include paper, cardboard, leather, films, regenerated cellulose, textiles, plastic, glass, ceramic and metal. The substrate preferably has an opaque color.

The miniemulsion can be used both undiluted and diluted with water for coating or printing. It is preferably used in a concentration of from 30 to 50, particularly preferably from 35 to 45, for example about 40, % by weight, based on the total weight of the emulsion, of disperse phase. However, higher or lower concentrations of the disperse phase are also suitable.

For coating or printing on the substrates, the novel miniemulsion is applied to the substrate, if required oriented, if required dried and polymerized.

The application of the cholesteric layer to the substrate can be effected by means of conventional methods, for example by means of methods which are selected from air blade coating, knife coating, air knife coating, squeegee coating, impregnation, reverse roll coating, transfer roll coating, gravure coating, kiss coating, casting, spray coating, spin coating or printing processes, such as relief printing, gravure printing, flexographic printing, offset printing, inkjet printing, letterpress printing, pad printing, heat-seal printing or screen printing processes. Printing processes in the context of the invention are, however, also those in which the coating material is applied to a substrate, for example, by using a ballpoint pen or a fountain pen. The novel miniemulsion is particularly preferably used in the inkjet printing process. The dry layer thickness of the applied cholesteric layer is from about 0.5 to 15 µm, in particular from 1 to 10 µm, preferably from 3 to 6 µm.

The cholesteric layer is as a rule oriented spontaneously during the application process, but it can also be oriented in a downstream step. In this case, the orientation is effected by means of known methods, for example the interaction of the liquid crystalline phase with orientation layers, the application of electric or magnetic fields or mechanical knife-coating of the liquid crystalline layers. Preferably, however, the orientation is effected spontaneously under the action of the shearing forces effective during the application.

The applied cholesteric layer can then be dried by means of conventional methods, for example with hot air. In order to achieve a particularly pronounced color flop, the cholesteric layer is preferably mechanically oriented again, for example by means of a smooth roll or a relief roll, a roller, by compressed air or by treatment with a plush pad, shortly before the complete drying.

The polymerization of the cholesteric layer can be effected thermally, by electron beams or preferably photochemically.

After the polymerization, the cholesteric layer can be provided with a transparent protective layer, i.e. a top coat. Suitable top coats comprise all top coats which are known to a person skilled in the art for the corresponding substrate and which will be discussed in more detail below. The top coat is preferably chosen from top coats based on polyurethane, polyesterurethane, polyesteracrylate or nitrocellulose lacquer. The protective layer is preferably photochemically crosslinkable if the polymerization of the cholesteric layer is effected photochemically. In this case, the cholesteric layer is particularly preferably not completely polymerized, so that a part of the cholesteric layer is crosslinked with the protective layer in the subsequent crosslinking of the protective layer. The top coat preferably has a layer thickness of at least 5 µm, particularly preferably at least 10 µm. Preferably, the top coat contains a light stabilizer. Advantageously, the top coat is based on an aqueous system.

In the case of certain substrates, in particular leather and plastic, but also in the case of all other substrates mentioned above, the coating can also be effected by the transfer process. For this purpose, a film (transfer film) coated with a cholesteric layer is applied to the substrate, and the cholesteric layer is transferred to the substrate under pressure and/or at elevated temperatures. If required, the coated substrate can be subsequently embossed by conventional methods. The film either remains as a protective layer on the coated substrate or is peeled off from it. In the latter case, a top coat is preferably applied to the cholesteric layer.

The transfer film, preferably a polyethylene, polyethylene terephthalate, polypropylene or polyacetate film, is preferably subjected to a corona treatment, i.e. sputtered with electron beams, ion beams or other particle beams, before the application of the cholesteric layer. The coating with the cholesteric miniemulsion, the drying and orientation are carried out as described above. If required, an adhesion promoter which is intended to impart improved adhesion between the substrate and the transferred cholesteric layer may also be applied to the cholesteric layer.

Before the coating or printing, the substrates are, if required, treated in a suitable manner.

The substrates are pretreated in such a way that a smooth surface which is as continuous as possible and not very absorptive forms.

The pretreatment of cellulose-containing substrates, such as paper, cardboard and also wood, preferably comprises coating (priming) the substrate with a mixture which comprises preferably at least one resin. The resin is preferably selected from aminoplasts, such as melamine resins and urea resins, and acrylate resins. The resin particularly preferably comprises a melamine resin, in particular a melamine/formaldehyde resin. Particularly preferred mixtures for coating cellulose-containing substrates comprise a melamine resin, a urea resin and an acrylate resin and are described in EP-B 384 506, which is herewith fully incorporated by reference. Acrylate resins alone are also suitable in principle; the use of a coating whose main component is an aminoplast, in particular a melamine resin, is, however, particularly preferred in the case of paper and board.

The pretreatment of leather is effected in a generally known manner by impregnation and/or bottoming. If the leather is to be coated by the transfer process, an adhesion promoter is preferably applied to the bottomed/impregnated leather. Preferably used adhesion promoters are those based on polyurethane, for example Luphen® and Astacin® Grund UH from BASF AG.

The pretreatment of plastics which are used as transfer films is preferably effected, as described above, by corona treatment.

The pretreatment of textiles is preferably effected in the form of a fine polyurethane-based coating. Preferably, the surface is silicone-free.

After the application of the cholesteric layer, the latter may also be provided with a suitable protective layer, i.e. a top coat. Aqueous top coats are preferably used.

Suitable protective layers for cellulose-containing substrates are preferably obtained with the products of the Laromer® group from BASF AG and in particular with the product HH 52-0104 from BASF Coatings.

Suitable protective layers for leather preferably comprise polyurethanes, in particular aliphatic polyurethanes, and polyacrylates. In order to increase the gloss, the protective layers may contain conventional gloss improvers, such as waxes, casein, etc. An adhesion promoter is preferably applied to the leather coated with the cholesteric layer, before the application of the top coat.

Suitable protective layers for plastics correspond to those for cellulose-containing substrates.

Of course, the novel cholesteric miniemulsion can also be processed to give cholesteric effect pigments. The relevant procedure corresponds to the processes known from the prior art, for example from DE-A 197 38 369, for the preparation of cholesteric effect pigments, which comprise applying a cholesteric layer to a carrier, if required orienting the layer, drying, polymerizing and removing the cured layer from the carrier and comminuting to give pigments.

An advantage of using the novel miniemulsion for coating or printing is the capability of spontaneous orientation of the cholesteric phase, which thus permits the coating or printing of substrates with complex geometric shapes and on different materials.

The present invention furthermore relates to a two-component system which contains two novel storage-stable aqueous miniemulsions which differ, for example in the case of otherwise identical composition, only in the concentration of the components c). The concentrations of component c) are preferably chosen in each case so that the 1st emulsion gives an LC effect coating having a reflection wavelength of from 300 to 380 nm and the second emulsion gives an LC effect coating having a reflection wavelength of from 700 to 800 nm. LC is liquid crystal. If these two miniemulsions are mixed, LC coatings having defined reflection wavelengths can be produced depending on the proportions of the two emulsions, it being possible to establish all hues which reflect from 400 to 630 nm. The required concentration of the component c) is dependent on the thickness of the cholesteric layer, the natural color of the substrate and other factors.

The present invention furthermore relates to the use of the two-component system defined above for coating or printing on flexible and rigid substrates and a process for coating or printing on flexible or rigid substrates with the two-component system defined above. Here, the coating or printing on substrates is carried out as described above after mixing of two novel miniemulsions which differ substantially only in the concentration of the component c).

The two-component system is particularly preferably used in printing processes, in particular in jet printing processes, such as the inkjet printing process. Jet printing processes are to be understood as meaning those printing processes in which drops of defined color or those which produce a defined color emerge from one or more jets. Two or more drops of identical or different color or color production are superposed, with the result that the entire color scale of the visible spectrum can be produced. With the use of the novel two-component system, it is advantageous that only two miniemulsions are required to produce the entire color spectrum. These are preferably chosen so that one emulsion gives a coating with a reflection wavelength from 300 to 400 nm and the second emulsion gives a coating with a reflection wavelength from 600 to 800 nm. If printing is not effected on a black background, it is advantageous additionally to combine the two-component system with black printing ink, for example with black injet ink. Depending on the substrate and the amount of the two miniemulsions applied, effect coatings having different color flops and brilliance are obtained. After the emergence of the color drops, the coating is preferably irradiated and cured by means of UV radiation.

The examples which follow illustrate the invention without restricting it.

1. PREPARATION EXAMPLE

1.1 Preparation of a Miniemulsion

Batch: 842.0 parts by weight of cholesteric mixture

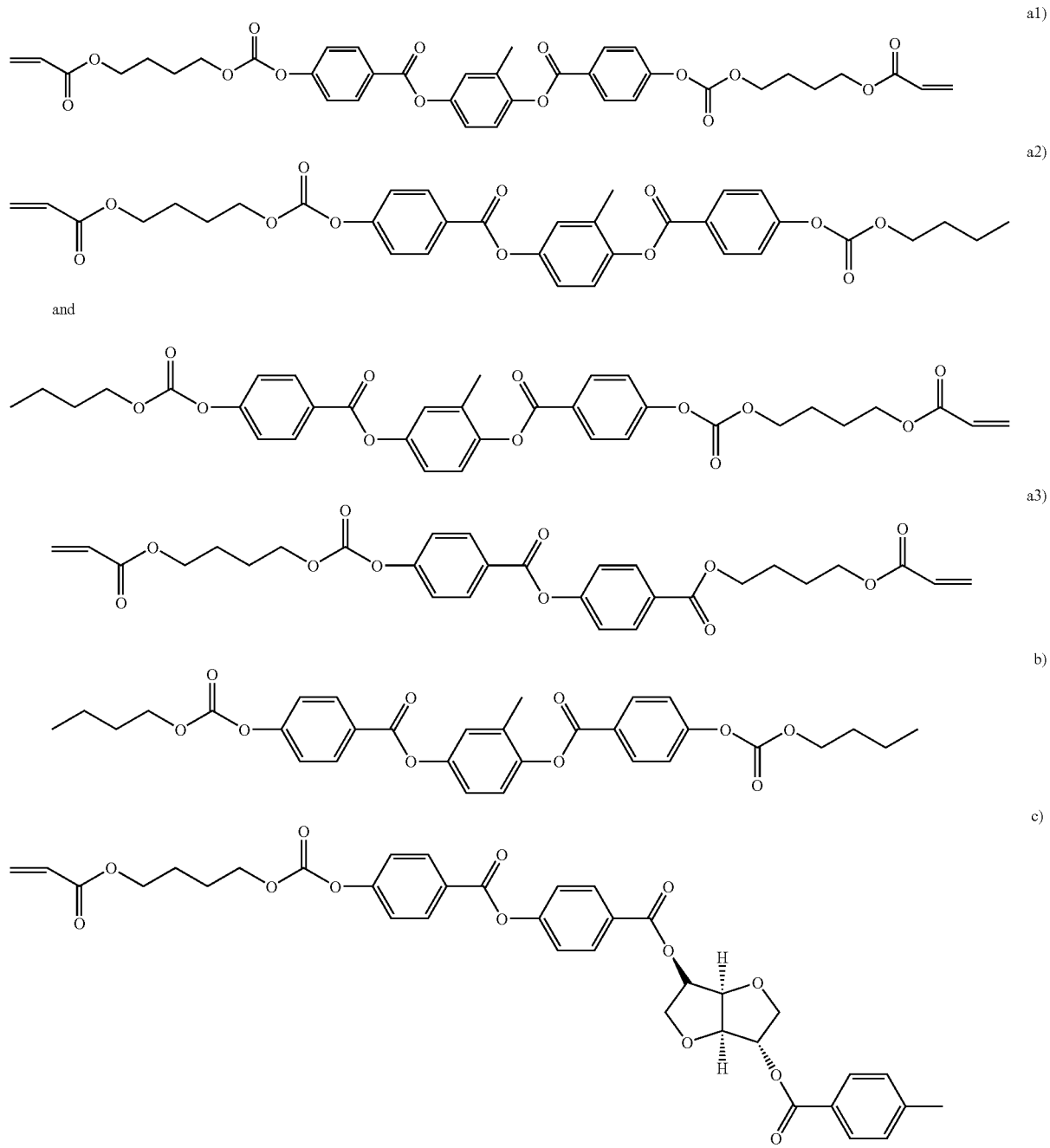

-continued

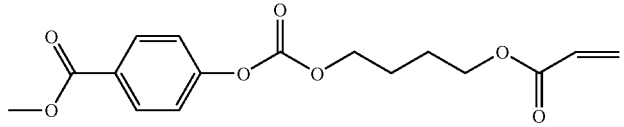

42.1 parts by weight of emulsifier K30 (Bayer; a predominantly secondary sodium $C_{10}$-$C_{18}$-alkanesulfonate; 40% strength in water)

24.1 parts by weight of Acrysol® RM-8 (Rhom & Haas; polyurethane thickener; 35% strength in propylene glycol/water)

8.4 parts by weight of Tego® wet 260 (Tego Chemie; substrate wetting additive; 10% strength dispersed in water)

529.0 parts by weight of water.

The cholesteric aqueous mixture was preemulsified with the aid of an Ultra-Turrax. After an emulsification time of 15 minutes, a preemulsion having a particle size of from 1 to 2 µm was obtained. The preemulsion was then homogenized using a microfluidizer from Microfluidics with Y- and Z-chamber at about 1 000 bar. An aqueous, colorless emulsion having a volume average particle size of from 200 to 400 nm was obtained. The shelf life was more than 6 months.

2. USE EXAMPLES

2.1. Production of an Effect Film Coating a) A paper printed in black was coated with the primer HH 43-0171 (BASF Coatings). The cholesteric layer was applied on a paper web or film coating machine. For this purpose, a miniemulsion (miniemulsion 1) from 1. was mixed with 4% by weight of a 1:1 mixture of the two photoinitiators 2-methyl-1[4-(methyl-thio)phenyl]-2-morpholinopropan-1-one and 1-hydroxycyclohexyl phenyl ketone and diluted with water to a concentration of 40% by weight of disperse phase. In this miniemulsion 1, the concentration of the nematic components a1), a2), a3) and b) was 96.2% by weight and that of the chiral component c) was 3.8% by weight, based on the total weight of the components a1), a2), a3), b) and c). The nematic components a1), a2), b) and a3) were present in a molar ratio of 1.0:2.2:1.3:2.7. The dilute emulsion was fed by means of a pump under slightly superatmospheric pressure to a partitioned gravure roll, from where it was then transferred via a rubber roll, using a counter-rotating pressure roll, to the paper web in such a way that a wet coat of from 7 to 10 g/m² formed; this corresponds to a dry coat thickness of from 2.8 to 4 µm. The paper web passed through a drying tunnel with air at 70° C. The cholesteric layer was then crosslinked by means of UV light. A brilliant dark blue coating was obtained.

b) The procedure was as in a) with the use of a miniemulsion 2 which contained 97.6% by weight of the nematic components a1), a2), b) and a3) in a molar ratio of 1.0:2.3:1.3:2.8 and 2.4% by weight of the chiral component c), based on the total weight of the components a1), a2), a3), b) and c). A brilliant red coating was obtained.

If the cholesteric layer in a) or b) was also coated with a top coat, the crosslinking was not effected completely but said layer was subjected to UV irradiation with an energy of about 100 mJ/cm² (for comparison: for complete curing: about 225 mJ/cm²). Thereafter, the top coat was applied and the coating was subjected to UV irradiation. The top coat used was HHS2-0104, a commercial product from BASF Coatings, to which had been added as a photoinitiator SRO-7641H (commercial product from BASF Coatings).

When a paper printed in brown or gray was used as the substrate, a gold-colored or silvery iridescent coating was obtained.

2.2 Production of an Effect Film Coating using a Two-Component System

The dilute miniemulsions 1 and 2 which are described in 2.1 a) and b) and to which photoinitiator was added were mixed in each case in the mixing ratios shown in table 1.

Coating was carried out as described in 2.1. Depending on the mixing ratio of the two miniemulsions, the brilliant coating colors shown in table 1 and having color flops in the range of about 3 hues above and below the base color shown in the table were obtained. Thus, in the case of a green coating, a color flop from blue to orange was evident.

TABLE 1

| Miniemulsion 1 [% by weight] | Miniemulsion 2 [% by weight] | Coating color | $\lambda_{max}$ [nm] |
|---|---|---|---|
| 100 | 0 | violet-blue | 397 |
| 93 | 7 | violet-blue | 407 |
| 87 | 13 | violet-blue | 423 |
| 80 | 20 | violet-blue | 428 |
| 73 | 27 | blue | 439 |
| 67 | 33 | blue | 454 |
| 60 | 40 | blue | 479 |
| 53 | 47 | blue | 487 |
| 47 | 53 | blue-green | 503 |
| 40 | 60 | green-blue | 513 |
| 33 | 67 | green | 529 |
| 27 | 73 | green-yellow | 566 |
| 20 | 80 | yellow-green | 580 |
| 13 | 87 | orange | 586 |
| 7 | 93 | red-orange | 606 |
| 0 | 100 | red | 644 |

2.3. Production of a Hologram using a Two-Component System

The pretreatment and coating of the paper with the cholesteric layer were carried out as described in 2.1 with the use of the two-component mixtures shown in 2.2, table 1. After the coating, a hologram was produced with the aid of a die. Thereafter, crosslinking was effected with the aid of UV light as described in 2.1 and a protective layer was applied. Holograms having the brilliant colors shown in table 1 and very many angle-dependent color reflections were obtained.

2.4. Production of an Effect Coating on a PVC Film

A cholesteric layer was applied to a black PVC film by the procedure described in 2.1, omitting the pretreatment. A two-component mixture according to 2.2, consisting of 33% by weight of miniemulsion 1 and 67% by weight of miniemulsion 2, was used. A brilliant green coating having a pronounced color flop from blue to red was obtained.

2.5. Production of an Effect Coating on Leather

Bottoming formulation:
- 150 parts by weight of Lepton® Schwarz N (BASF AG; aqueous pigment formulation)
- 150 parts by weight of Lepton® Filler CEN (BASF AG; filler and antiadhesion composition; aqueous dispersion of a mixture of fatty esters, proteins and inorganic fillers)
- 50 parts by weight of Eukesol® oil bottom (BASF AG; cationic oil emulsion)
- 50 parts by weight of water
- 200 parts by weight of Corialgrund® BAN (soft, high-hiding acrylate binder)
- 100 parts by weight of Corial® Mikrobinder AM (soft, penetrating acrylate binder)
- 20 parts by weight of Amollan® VC (BASF AG; leveling agent)
- 10 parts by weight of Amollan® E (BASF AG; leveling agent)
- depending on requirements, Lepton® Paste VL (BASF AG; viscosity modifier)

The surface of the crust cattle leather was provided with colored bottom using the bottom formulation of the above composition. After drying, the adhesion promoter Astacin® Grund UH (BASF AG) was applied to the leather surface by spraying.

A cholesteric layer was applied to the pretreated leather. Coating was carried out using the dilute miniemulsions 1 and 2 which are described in 2.1 a) and b) and to which photoinitiators had been added, said miniemulsions being mixed in each case in the mixing ratios shown in table 1 (cf. 2.2). Depending on the desired effect, the application was effected by spraying, by means of a gravure roll or of a roll coater or by the screen printing process. The application was effected in such a way that a wet coating of from 7 to 10 g/m² was obtained, which corresponds to a dry coat thickness of from 2.8 to 4 µm. The coated leather was then dried in a drying tunnel with air at 70° C.

In order to produce a strong color flop, the coating was subsequently oriented with a relief roll, a Teflon roller, by compressed air or by treatment with a plush pad. The cholesteric layer was then crosslinked using UV light. Depending on the mixing ratio of the two miniemulsions, the brilliant colors shown in table 1 and having a color flop in the range of about 3 hues above and below the base colors shown in table 1 were obtained. Thus, a green coating (33% by weight of miniemulsion 1, 67% by weight of miniemulsion 2) had a pronounced color flop from blue-green to yellow-green to gold-colored.

A top coat of the following composition was applied to the cholesteric layer by spraying:
- 250 parts by weight of Lepton® Top (BASF AG; acrylate top coat)
- 250 parts by weight of Astacin® Finish PUM (BASF AG; aqueous 40% strength polyester/polyurethane dispersion)
- 500 parts by weight of water
- 30 parts by weight of Astacin curing agent CN (BASF AG; isocyanate crosslinking agent)
- adjustment of the mixture with Lepton® Paste VL (BASF AG; thickener) to spraying viscosity

2.6. Production of an Effect Coating on Leather by the Transfer Process

2.6.1. Production of a Transfer Film

A PET film was pretreated by being sputtered by means of electron beams. Thereafter, a cholesteric layer was applied by the process described in 2.1. and was dried and crosslinked using UV light. The dilute miniemulsions 1 and 2 which are described in 2.1. a) and b) and to which photoinitiator was added were used for coating in a mixing ratio of 33% by weight of miniemulsion 1 to 67% by weight of miniemulsion 2.

2.6.2. Coating of the Leather by the Transfer Process

In each case a transfer primer, an adhesion promoter between the leather surface and the cholesteric layer to be applied, containing 300 parts by weight of Luphen® D DS 3482X (BASF Schwarzheide GmbH; a heat-activatable adhesive) and 700 parts by weight of water, was applied by spraying to three different leather grades (matt; glossy; special shoe leather) in each case impregnated and bottomed as described in 2.5.

The transfer film produced according to 2.6.1. was applied with the cholesteric side to the respective leather, and the cholesteric layer was transferred to the leather at 80° C. and 100 bar by means of a hydraulic embossing press for embossing grain on leather. After cooling, the film was peeled off. A green coating having color flops from blue-green to yellow-qreen was obtained. A top coat primer, an adhesion promoter between the cholesteric layer and the top coat to be applied, of the following composition was applied to the cholesteric layer by spraying on:
- 200 parts by weight of Astacin® Grund UH (BASF AG; aromatic polyurethane)
- 20 parts by weight of Astacin® Härter CN (BASF AG; isocyanate crosslinking agent)
- 500 parts by weight of water
- 300 parts by weight of ethanol Depending on the leather grade, three different top coats of the following composition were then applied by spraying:

Glossy leather—glossy top coat:
- 700 parts by weight of Astacin® Top LH (BASF AG; aliphatic polyesterurethane)
- 5 parts by weight of Corial® Härter AZ (BASF AG; trimethylolpropane tris(β-aziridino)propionate)
- 300 parts by weight of water Matt leather—matt top coat:
- 400 parts by weight of Astacin® Top LH
- 300 parts by weight of Astacin® Matt MA (BASF AG; aliphatic polyesterurethane and inorganic dulling agent)

300 parts by weight of water
6 parts by weight of Corial® Härter AZ

Shoe leather—partly glossy top coat:
6 parts by weight of Corial® Härter AZ
75 parts by weight of Luron Lustre TE (BASF AG; casein-wax formulation)
25 parts by weight of Luron Top (BASF AG; aqueous casein formulation)
575 parts by weight of water
200 parts by weight of Lepton® Top LD 6626 (BASF AG; polyacrylate)
100 parts by weight of Lepton® Top LB (BASF AG; aqueous polyacrylate-wax formulation)
20 parts by weight of Lepton® Wachs CS (BASF AG; cationic emulsion of a silicone-containing polymer)

We claim:

1. A storage-stable aqueous miniemulsion, comprising:
a disperse phase which comprises the following components:

a1) an achiral nematic difunctionally polymerizable monomer, a2) two achiral nematic monofunctionally polymerizable monomers, a3) an achiral nematic difunctionally polymerizable monomer, b) an achiral nematic nonpolymerizable compound and c) a chiral di- or monofunctionally polymerizable monomer, the nematic components a1), a2) and b) having the same mesogenic group and a3) having a mesogenic group differing from this.

2. A miniemulsion as claimed in claim 1, wherein the mesogenic group of the nematic components a1), a2) and b) comprises a substituted 1,4-dioxybenzene building block.

3. A miniemulsion as claimed in claim 2, wherein the disperse phase comprises the following components:

a1)

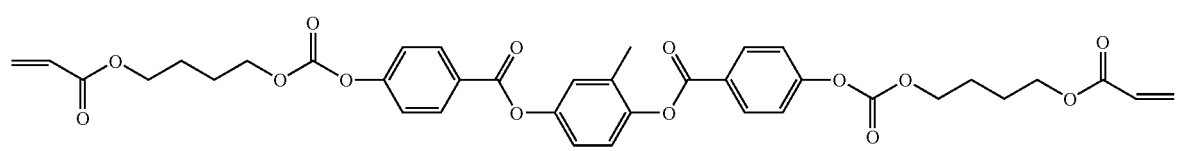

a2)

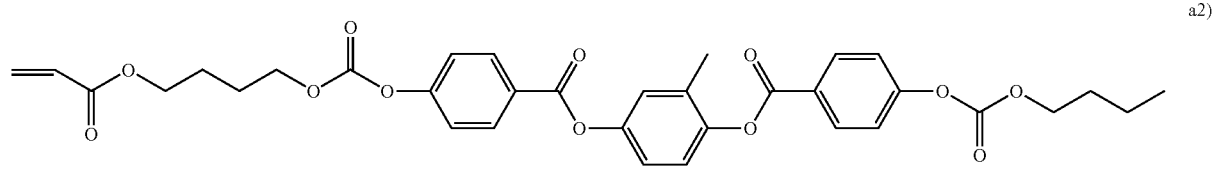

and a3)

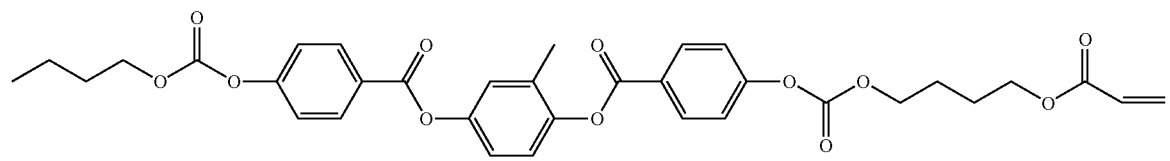

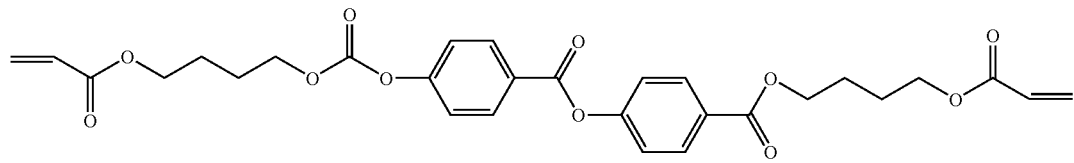

b)

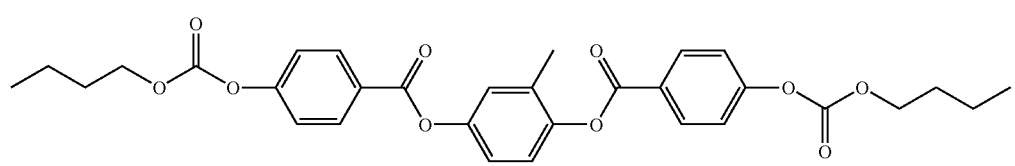

-continued

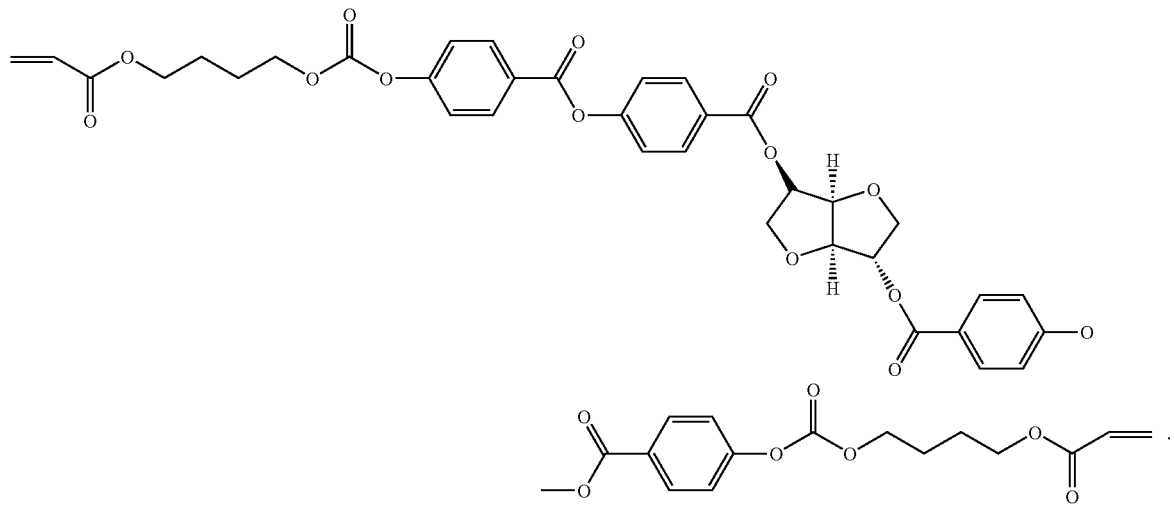
c)

4. A miniemulsion as claimed in claim 1, which comprises not more than 5% by weight, based on the total weight of the disperse phase, of assistants.

5. A miniemulsion as claimed in claim 1, having a volume average droplet size of the disperse phase of from 100 to 600 nm.

6. A process for the preparation of a storage-stable aqueous miniemulsion as claimed in claim 1, wherein all constituents of the disperse phase are first emulsified in a conventional manner in water and the conventional emulsion obtainable thereby is then treated with a high-pressure homogemzer.

7. A process as claimed in claim 6, wherein the mixture is emulsified at from 50 to 2000 bar.

8. A method, which comprises
coating or printing on flexible and rigid substrates the storage stable aqueous mini-emulsion as claimed in claim 1.

9. A process for coating or printing on flexible and rigid substrates, wherein a storage-stable aqueous miniemulsion as claimed in claim 1 is applied to the substrate, optionally oriented, optionally dried and polymerized.

10. An article provided with a coating or a print comprising a storage-stable aqueous miniemulsion as claimed in claim 1.

11. A two-component system containing two storage-stable aqueous miniemulsions as claimed in claim 1, wherein the concentrations of the components c) are different in each case with otherwise identical composition.

12. A two-component system as claimed in claim 11, the concentrations of component c) being chosen in each case so that the first emulsion gives an LC effect coating having a reflection wavelength of from 300 to 400 nm and the second emulsion gives an LC effect coating having a reflection wavelength of from 600 to 800 nm.

13. A method for producing an having a LC effect coating comprising:
applying the two-component system as claimed in claim 11 to said article;
optionally orienting said miniemulsions, optionally drying and polymerizing said miniemulsions.

14. A process for producing an LC effect printed article, which comprises:
applying the two-component system as claimed in 11 to said article with a printer;
optionally orienting said miniemulsions, optionally drying and polymerizina said miniemulsions.

* * * * *